(No Model.)

G. H. BARTLETT.
WHEEL.

No. 418,673.

Patented Jan. 7, 1890.

WITNESSES.
Walter W. Lovegrove
George E. Wilcox

INVENTOR.
George Herman Bartlett
by Hinsdill Parsons
ATTORNEY.

UNITED STATES PATENT OFFICE.

GEORGE HERMAN BARTLETT, OF HOOSICK FALLS, NEW YORK.

WHEEL.

SPECIFICATION forming part of Letters Patent No. 418,673, dated January 7, 1890.

Application filed August 13, 1888. Serial No. 282,491. (No model.)

*To all whom it may concern:*

Be it known that I, GEORGE HERMAN BARTLETT, a citizen of the United States, residing at Hoosick Falls, county of Rensselaer, and State of New York, have invented certain new and useful Improvements in Driving or Traction Wheels for Agricultural Machines, of which the following is a full, clear, and exact description, reference being had to the accompanying drawings, forming a part of this specification.

My invention has for its object to so secure the traction-lugs to the periphery of the driving-wheel that they will increase its strength, and also to use a minimum number of rivets or other fastening devices in so securing the traction-lugs, thereby saving expense both in the cost of material and labor. To this end the traction-lugs are continuous with the periphery of the wheel, and a rivet passing through the adjacent ends of two consecutive lugs secures them to the wheel.

Figure 1:
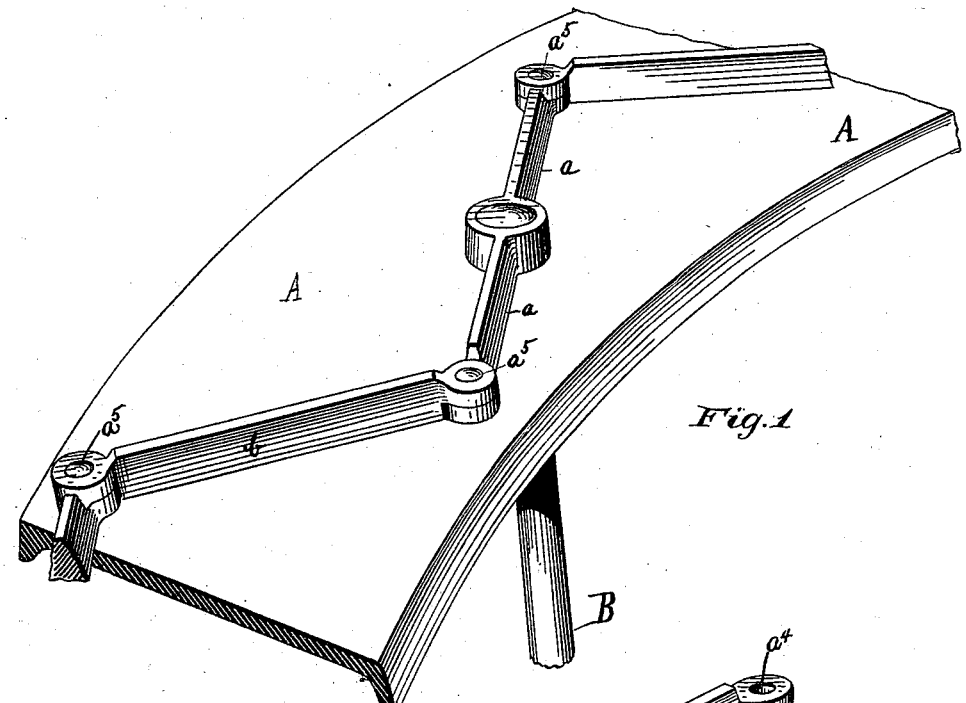
Figure 2:
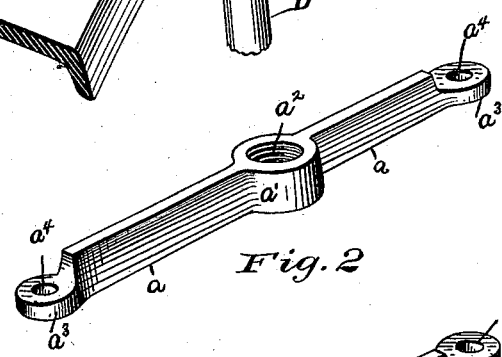
Figure 3:
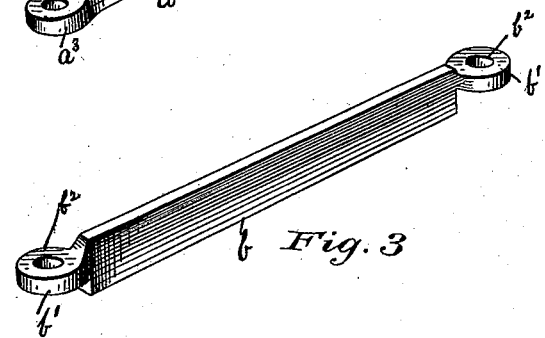

Referring to the accompanying drawings, in which similar letters of reference indicate like parts, Figure 1 is a perspective view of a portion of the periphery of a mower driving-wheel having its traction-lug secured thereto in accordance with my invention. Fig. 2 is a perspective view of a lug through which one of the spokes of the wheel passes. Fig. 3 is a perspective view of one of the intermediate lugs.

A is the rim of the driving-wheel, and B one of the spokes.

The wheel is made of steel, of any well-known form of construction—for instance, in accordance with patent granted John M. Rosebrooks, October 13, 1885, No. 328,068.

The lug $a$ is made with an enlarged portion $a'$, which is provided with a threaded hole $a^2$, into which takes the threaded end of the spoke B. The spoke B passes up through the rim of the wheel. The lug $a$ is further provided with the flattened portions $a^3$ $a^3$, through which are bored the hole $a^4$ $a^4$, to receive the rivets $a^5$. The lug $b$ is formed also with the flattened portions $b'$ $b'$ and the rivet-holes $b^2$ $b^2$. The portions $a^3$ $a^3$ are flush with the under side of the lug $a$, and the portions $b'$ $b'$ are raised a sufficient distance above the lower surface of the lug $b$ so that the lug $b$ will rest upon the surface of the rim of the wheel and at the same time permit the ends $b'$ to lap over the ends $a^3$ and the holes $b^2$ to register with the holes $a^3$. A single rivet $a^5$, passing through the holes $a^3$ $b^2$, secures the contiguous ends of the lugs to the rim of the wheel and to each other. A lug $b$ is secured between two of the lugs $a$. The lugs extend diagonally across the face of the rim of the wheel and prevent the slipping of the wheel and give the wheel sufficient traction or hold upon the ground to drive the operative devices of the machine, and inasmuch as the lugs are continuous they serve to strengthen the wheel, besides preventing the usual jarring of the machine incident to that class of machines in which the traction-lugs are secured transversely to the rim, but are not continuous therewith.

Having now described my invention, what I claim as new, and desire to secure by Letters Patent, is—

1. The combination, with the rim of a wheel, of the traction-lugs flattened and perforated at each end and extending diagonally across the rim, and rivets uniting the lugs to each other and to the rim of the wheel, substantially as and for the purpose specified.

2. The combination, with the rim of a wheel and its spokes, of the traction-lugs perforated at the center to receive the spokes and at each end, and secured diagonally to the convex surface of the rim of the intermediate lugs perforated at each end, and rivets uniting the lugs to each other and to the rim of the wheel, substantially as and for the purpose described.

GEORGE HERMAN BARTLETT.

Attest:
DANFORTH GEER,
HUGH POMEROY BLACKINTON.